United States Patent [19]

Wallrafen

[11] Patent Number: 4,814,701

[45] Date of Patent: Mar. 21, 1989

[54] METHOD AND APPARATUS FOR DETERMINING ANGULAR VELOCITY FROM TWO SIGNALS WHICH ARE A FUNCTION OF THE ANGLE OF ROTATION

[75] Inventor: Werner Wallrafen, Birnheck, Fed. Rep. of Germany

[73] Assignee: VDO Adolf Schindling AG, Frankfurt am Main, Fed. Rep. of Germany

[21] Appl. No.: 118,182

[22] Filed: Nov. 6, 1987

[30] Foreign Application Priority Data

Nov. 10, 1986 [DE] Fed. Rep. of Germany ....... 3638298

[51] Int. Cl.$^4$ ................................................ G01P 3/42
[52] U.S. Cl. ...................................... 324/160; 324/165
[58] Field of Search ............... 324/160, 163, 165, 166, 324/168

[56] References Cited

U.S. PATENT DOCUMENTS 3,860,869  1/1975  Parks .................................. 324/163

*Primary Examiner*—Reinhard J. Eisenzopf
*Assistant Examiner*—Anthony L. Miele
*Attorney, Agent, or Firm*—Martin A. Farber

[57] ABSTRACT

A method and an apparatus for determining angular velocity from two voltage signals which are produced by an angle transmitter (1) having a sinusoidal function with respect to the angle of rotation of a rotatable member and are shifted in phase by 90 angular degrees. The amount and sign of the angular velocity ($\omega$) are determined by the division of the derivative of a first voltage signal with respect to time by the second voltage signal when said second voltage is above zero. In that signal range in which the second voltage signal passes below zero, the derivative of the second voltage signal with respect to time is divided by the first voltage signal. Alternatively, the amount of the angular velocity ($\omega$) is determined from the vector sum of the derivatives of the two voltage signals with respect to time. The sign of the angular velocity is determined from the two voltage signals and their derivatives.

3 Claims, 4 Drawing Sheets 4,814,701

METHOD AND APPARATUS FOR DETERMINING ANGULAR VELOCITY FROM TWO SIGNALS WHICH ARE A FUNCTION OF THE ANGLE OF ROTATION

FIELD AND BACKGROUND OF THE INVENTION

The invention relates to a method and a device for determining angular velocity from two voltage signals produced by an angle transmitter which signals have a sinusoidal course with respect to the angle of rotation of a rotatable body and are shifted 90 degrees in phase with respect to each other.

For relatively slow linear or rotating movements, detection of the instantaneous speed is difficult and expensive. In speed-of-rotation transmission systems or in angle decoders, high resolutions are necessary for the continuous determination of the angular velocity inasmuch as disturbing sudden changes occur in the values of the angular velocity as a result of sequential discrete speed-of-rotation data. With too small a number of pulses per revolution it is necessary therefore to form a mean value which results in a lag time and can frequently not be used in true-time applications.

With an angle transmitter (for instance, resolver, potentiometer, magnet field sensor, etc.) the instantaneous position angle can be detected. One widely used form of signal is the sine-cosine system by which the angle of rotation of a rotating member can be unambiguously defined with respect to a zero position. Every change in angle causes a corresponding change in signal of the sine and cosine measurement channels.

It is an object of the present invention to provide a method of determining the angular velocity from two voltage signals produced by an angle transmitter which have a sinusoidal course with respect to the angle of rotation of a rotatable member and are shifted by 90 degree in phase with respect to each other, and to develop a circuit for the carrying out of the method.

SUMMARY OF THE INVENTION

According to the invention, the amount and the sign of the angular velocity ($\omega$) are determined by division of the derivative with respect to time of a first voltage signal by the second voltage signal when the second voltage signal is above zero. Furthermore, within the signal region in which the first voltage signal passes below zero, the derivative with respect to time of the second voltage signal is divided by the first voltage signal and inverted. Alternatively, the angular velocity is determined from the vector sum of the derivatives with respect to time of the two voltage signals and the sign is determined from the two voltage signals and their derivatives with respect to time by ascribing the sign of the angular velocity to the corresponding sign of the voltage signals and their derivatives.

By the method described above, the amount and sign of the instantaneous value of the angular velocity can be determined in advantageous fashion in the case of slow rotary movements. The method can be employed not only for rotary movements but also for linear movements which can be converted mechanically into the rotation of an angle transmitter. The angular velocity is available in the case of fractions of a complete circular revolution. The speed of rotation can be determined here by the angle transmitter without residual ripple and without dead time.

An apparatus for the carrying out of the method described above consists, in accordance with the invention, therein that a differentiating member (7) is connected in front of the dividend input of a divider circuit (8), that jointly actuatable switches (5, 6) are arranged in front of the differentiating member and the divisor input of the dividing circuit (8), wherein the the second voltage signal is in the region of passages above zero, the first voltage signal is applied to the differentiating member (7) and the second voltage signal to the divider input, and in the region of passages below zero of the second voltage signal the connection of the first and second voltage signals is reversed by the switches, and that a phase correction is effected by an inverter (9) via a switch contact (10).

The switching can preferably be effected as a function of the angular position with respect to a reference position. Before the angular positions 90° and 270° are reached in the case of the corresponding cosine signal and the angular positions 0° and 180° are reached in the case of the sine signal, switching is effected to, in each case, the other channel. With the circuit of very simple construction, switches are required so that there is an interruption in the delivery of the angular velocity values for the duration of the switching.

The differentiating member (7), the divider circuit (8) and the switches (5, 6, 10) are preferably circuits of analog operation. Such circuits have a high signal processing speed.

A preferred device for the carrying out of another embodiment is so developed that the two voltage signals are applied to different differentiating members (12a, 12b), that the outputs of the differentiating members (12a, 12b) are connected to a circuit (13) which produces the squares of the input variables, the sum of the squares and the square root of the sum of the squares, and that the sign of the angular velocity ($\omega$) is determined with a logic circuit from the two voltage signals and their derivatives with respect to time by interconnecting and monitoring the passages through zero.

With this arrangement, the contribution and the sign of the angular velocity are determined separately and made available continuously. One essential advantage of this arrangement resides in the extremely high velocity signal together with an infinitely high resolution.

In a preferred embodiment, two multiplies (52, 54), one of which is acted on the derivative of the first voltage signal and the second voltage signal, and the second by the derivative of the second voltage signal and the first voltage signal, are connected to the noninverting input and the inverting input respectively of a difference amplifier (55) behind which there are connected two comparators (56, 57), one of which determines passages through zero of the output signal of the difference amplifier towards the positive and the other passages through zero of the output signal of the difference amplifier towards the negative. The value of the angular velocity ($\omega$) is zero when the same signal levels are present on the outputs of the comparators (56, 57), the sign of the angular velocity being positive or negative depending on the two possible combinations when the signal levels are different.

Preferably the differentiating members (12a, 12b, 51, 53), the circuit (13) which produces the root of the sum of the squares, the sum of the squares and the squares of the input variables, and the multipliers (52, 54) are analog circuits. As differentiating members there can be used the differentiating members which are in any even present for the determination of the value of the angular velocity. The circuit expense for the determination of the sign of the angular velocity is therefore relatively slight.

Another favorable device for determining the sign of the angular velocity consists therein that each of the derivatives of the two dc voltage signals are connected to a comparator (34, 37; 35, 38) which responds at a minimum positive or negative reference voltage, that two AND members (39, 40; 41, 42; 43, 44; 45, 46) are arranged behind each comparator (34, 35, 37,38), that the AND members (39, 40) which are connected to the comparator (34) acted on by the derivative of the first voltage signal and by a positive reference potential are each acted on by the second voltage signal and its inversion, that the AND members (41, 42) which are connected to the comparator (35) acted on by the derivative of the first voltage signal and by a negative reference potential are each acted on by the inverted second voltage signal and by the second voltage signal, that the AND members (43, 44) which are connected to the comparator (37) acted on by the derivative of the second voltage signal and by a positive reference potential are each acted on by the inverted first voltage signal and the first voltage signal, that the AND members (45, 46) which are connected to the comparator acted on by the derivative of the second voltage signal and by a negative reference potential are each acted on by the first voltage signal and the inversion thereof, that the AND members (39, 41, 43, 45; 40, 42, 44, 46) of the comparators are combined in two rows by OR operation, each of which serves an AND member, and that with the same signal levels at the OR operations the angular velocity is zero with at different signal levels the sign of the angular velocity is either positive or negative as a function of the two possible combinations.

In this circuit arrangement only simple and inexpensive circuit components are used.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
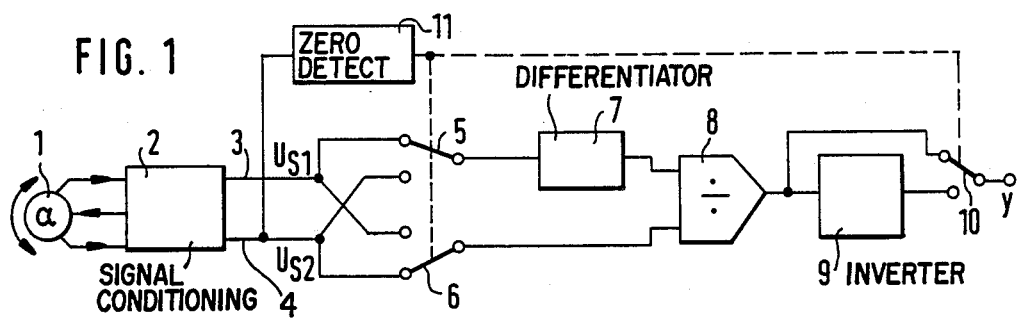
FIG. 1 is a block diagram of a first arrangement for the determination of the amount and sign of the angular velocity from two signals given off by an angle transmitter.

An angle transmitter 1, preferably a resolver, with subsequent preparation electronics 2 supplies two voltage signals $V_{S1}$ and $V_{S2}$ which have a sinusoidal course as a function of the angle of rotation. By a given geometrical arrangement of the transmitter sensor system the result is obtained that the sinusoidal output signals are shifted in phase by 90° of the angle of rotation to each other. For the voltage signals $V_{S1}$ and $V_{S2}$ there apply the relationship:

$$V_{S1} = V_0 \cdot \sin \alpha \text{ and}$$

$$V_{S2} = V_0 \cdot \cos \alpha,$$

in which $V_0$ is a constant voltage and $\alpha$ is the position angle of a sensor.

If any desired angle is set ($\alpha$=constant), the two signals $V_{S1}$ and $V_{S2}$ are pure voltage signals. If the angle $\alpha_1$ is varied in accordance with $\alpha_2$ then the two signals $V_{S1}$ and $V_{S2}$ change in accordance with the relationships indicated above. In this connection the signs need not necessarily change. Many sensors, for instance pressure, temperature or magnetic field strength, supply an output signal which depends on the parameters and therefore also on the time. Nevertheless, these signals are not variable values in the ordinary sense.

Commercial inductive resolvers supply output signals of the form $$V_1 = V_0 \cdot \sin \omega t \cdot \sin \alpha \text{ and}$$

$$V_2 = V_0 \cdot \sin \omega tx \cos \alpha$$

with $V_1 \cdot \sin \omega t$ as generator voltage dependent on time and $\omega$ as radian frequency.

The signals $V_1$ and $V_2$ are sinusoidal alternating voltage, the amplitude and phase of which are a function of the position angle. Upon a change in the angle $\alpha$ the generator alternating voltage is in practice modulated. The above-indicated type of signal is not used in the preparation electronics 2.

From the sine-cosine definition for $V_{S1}$ and $V_{S2}$ the angle $\alpha$ can be determined from the trigonometric relationship $\alpha$=arc tan $V_{S1}/V_{S2}$ (with $V_{S1} = V_0 \cdot \sin \alpha$, and $V_{S2} = V_0 \cdot \cos \alpha$).

One output 3 of the preparation electronics 2 is connected to the quiescent-current input of a first changeover contact 5 and to the operating current input of a second changeover contact 6. A second output 4 of the preparation electronics 2 is connected to the operating-current input of the changeover contact 5 and the quiescent current input of the changeover contact 6. The output of the changeover contact 5 is connected to a differentiation member 7 behind which the dividend input of a divider circuit 8 is connected. Behind the output of the changeover contact 6 the divisor input of the divider circuit 8 is connected. The two changeover contacts 5, 6 can be actuated jointly by a zero-voltage comparator 11 which has an input connected with the output 4. The divider circuit 8 is connected on the output side, on the one hand, to the input of an inverter 9 and, on the other hand, to the quiescent current input of a changeover contact 10 whose operating current input is connected to the output of the inverter 9 to effect an inversion. The changeover switch 10 is also actuated with the zero voltage detector 11.

In general, we have for every angular position at any time at the output 3 with respect to the following signals (S₁ and S₂) representing voltages (V_{S1} and V_{S2})

$$S_1 = S_0 \cdot \sin\alpha, \text{ in which } \alpha = f(t).$$

In this connection as $S_1$ is the instantaneous value at the time, $S_0$ is the amplitude and $\alpha$ is the instantaneous angle of rotation, i.e. the angle at the time t moved over with respect to a reference position.

At the output 4 there appears a cosine oscillation in accordance with the equation $$S_2 = S_0 \cdot \cos\alpha, \text{ in which } \alpha = f(t) \text{ and}$$

in which $S_2$ is the instantaneous value of the signal.

The angular speed results from the division of the first derivative of the variable $S_1(t)$ with respect to time by the variable $S_2(t)$. For the angular speed designated by y there applies the relationship $$y = \frac{dS_1}{dt} / S_2 = \frac{S_0 \cdot \cos\alpha \cdot \frac{d\alpha}{dt}}{S_0 \cdot \cos\alpha} = \frac{d\alpha}{dt}$$

The differentiating member 7 forms from $S_1(t)$ the first derivative with respect to time $$\frac{dS_1}{dt} = S_0 \cdot \cos\alpha \cdot \frac{d\alpha}{dt}$$

which is fed to the dividing circuit 8 as dividend. The variable $S_2$ passes as divisor into the divider circuit 8, at the output of which the angular speed is available in amount and sign.

Boundary problems arise in the region in front of $\alpha = 90°$ and $\alpha = 270°$ since cos 90° and cos 270° are zero and division is no longer permitted. These problems are avoided by switching the changeover contacts 5, 6 and 10. The zero voltage comparator 11 preferably contains two comparators each of which responds to a positive and a negative limit value. The limit values are so selected that, for instance, the switching takes place at an angle $\alpha$ of 80° and 100° and of 260° and 280° respectively. It is also possible in each case to switch the channels at 45° and 135° and at 225° and 315° respectively. After the switching to the work contacts of the changeover contacts 5, 6 and 10 the angular speed y is obtained in accordance with the relationship $$-y = \frac{dS_2}{dt} / S_1 = \frac{-S_0 \cdot \sin\alpha \cdot \frac{d\alpha}{dt}}{S_0 \cdot \sin\alpha} = -\frac{d\alpha}{dt}$$

By the inverter 9 with the amplification factor V = −1, the phase-corrected output signal is produced.

Figure 2:
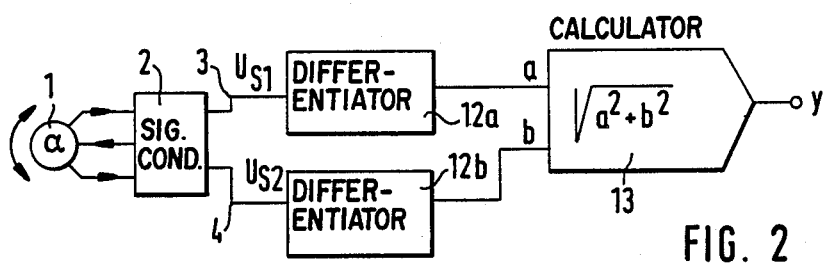
FIG. 2 is a block diagram of an arrangement for determining the amount of the angular velocity amount from two signals given off by an angle transmitter.

A block diagram of an arrangement for determining the angular velocity in amount is shown in FIG. 2. The signals of the outputs 3, 4 are connected directly to differentiating members 12a, 12b the outputs of which are connected to inputs of a circuit 13 which squares the input signals, produces the sum of the squares, and forms the square root from the sum (vector calculator).

As in the case of the circuit shown in FIG. 1, there applies for the angular velocity ω as a function of the angle of rotation α:

$$\omega = \frac{d\alpha}{dt}, \quad \alpha = f(t)$$

With the output signals $S_1$ and $S_2$ of the preparation electronics (transmitter preparation) 2 in accordance with the relationships $$S_1 = S_0 \cdot \sin\alpha \text{ and}$$

$$S_2 = S_0 \cdot \cos\alpha$$

the angular velocity $$y \sim \frac{d\alpha}{dt}$$

is determined. By differentiation of $S_1 = f(\alpha)$ and $\alpha = f(t)$ with reference to time (t), we have $$\frac{dS_1}{dt} = \frac{dS_1}{d\alpha} \cdot \frac{d\alpha}{dt}$$

For $\frac{dS_1}{dt}$ we have $\frac{dS_1}{dt} = S_0 \cdot \frac{d\alpha}{dt} \cdot \cos\alpha$ In the same manner for $\frac{dS_2}{dt}$ we have $\frac{dS_2}{dt} = -S_0 \cdot \frac{d\alpha}{dt} \cdot \sin\alpha$.

The angular velocity is to be determined in accordance with the following equation:

$$y = \sqrt{\left(\frac{dS_1}{dt}\right)^2 + \left(\frac{dS_2}{dt}\right)^2} = \sqrt{S_0^2 \cdot \left(\frac{d\alpha}{dt}\right)^2 \cos^2\alpha + S_0^2 \left(\frac{d\alpha}{dt}\right)^2 \cdot \sin}$$

From this there follows:

$$y = S_0 \cdot \left| \frac{d\alpha}{dt} \right|.$$

At the output of the circuit 13 we thus have the value $$S_0 \cdot \left| \frac{d\alpha}{dt} \right|,$$

i.e. the amount of the angular velocity y available, since by the pictorial addition of the vector components the directional information is lost.

Figure 3:
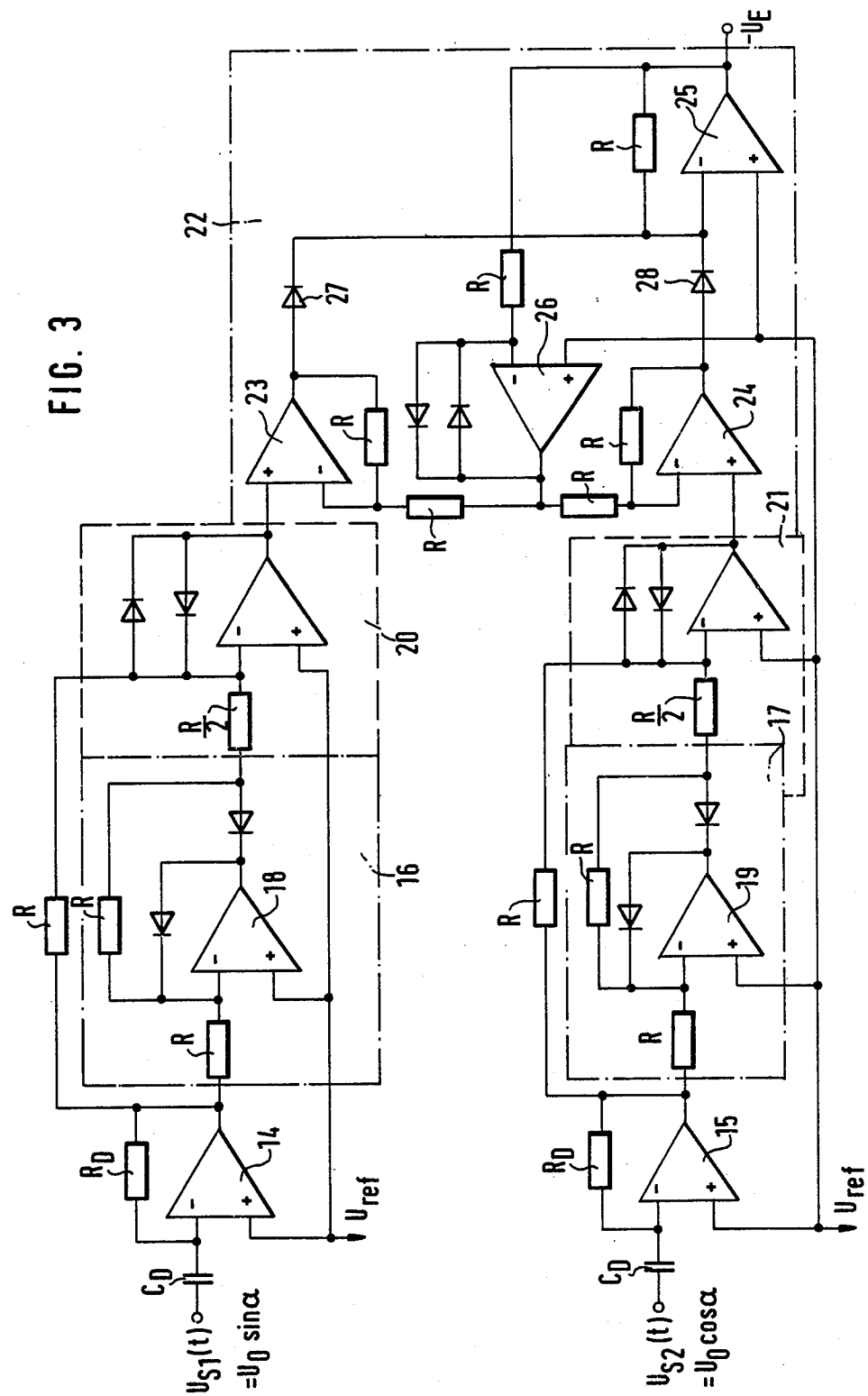
FIG. 3 is a circuit diagram of another arrangement for determining a variable which is proportional to the angular velocity.

FIG. 3 shows an analog operating circuit arrangement for the determination of a variable which is proportional to the angular velocity. The output voltages $V_{S1}(t) = V_0 \sin\alpha$ and $V_{S2}(t) = V_0 \cos\alpha$ of the angle transmitter 1 and of the preparation electronics 2 are fed via respective operational amplifiers 14, 15 connected as differentiator to rectifiers 16, 17. Each of the operational amplifiers 14, 15 has a feedback resistor of the size $R_D$ and a capacitor of the size $C_D$. In front of the inputs of the operational amplifiers 18, 19 arranged in the rectifier circuits there are arranged in each case resistors of the value R. The diodes arranged on the output side in the rectifiers 18, 19 are fed back via feedback resistors of the value R to the inverting input.

Logarithmic amplifiers 20, 21 follow the rectifiers 18, 19.

To the log amplifiers 20, 21, with operational amplifiers in front of the inverting inputs of which resistors of the value R/2 are connected, there is connected a circuit 22 which provides the antilogarithm of the input signals and produces the sum of the signals. For this, negative-feedback operational amplifiers 23, 24 are provided, to the non-inverting inputs of which there are fed the output signals of a log amplifier 20, 21. The operational amplifiers 23, 24 feed, via diodes not further designated, the inverting input of an operational amplifier 25 with negative feedback via a resistor of the value R. The output of the operational amplifier 24 is furthermore connected via a resistor of the value R to the inverting input of an operational amplifier 26 whose output feeds, in each case via a resistor of the value R, the inverting inputs of the operational amplifiers 23, 24, the feedback resistors of which in each case also have the value R. The operational amplifier 25 is part of a logarithmic amplifier lying in the feedback branch of the circuit containing the operational amplifiers 23 and 25 and 24 and 26 respectively. Diodes 27, 28 are connected behind the operational amplifiers 23, 24. At the output of the operational amplifier 25 there is a voltage $V_B$ which results from the following equation:

$$V_B = R_D \cdot C_D \cdot V_O \cdot \left| \frac{d\alpha}{dt} \right|$$

i.e. $V_B$ is proportional to the amount of the angular velocity $\omega$.

Figure 4A:
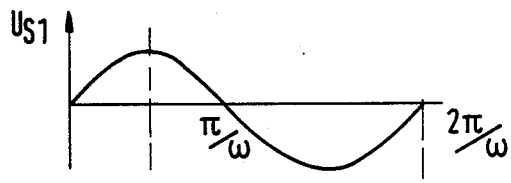
FIGS. 4a to 4d are time graphs of the two signals produced by the angle transmitter and of the derivatives with respect to time of the two signals in the case of constant angular velocity.
Figure 4B:
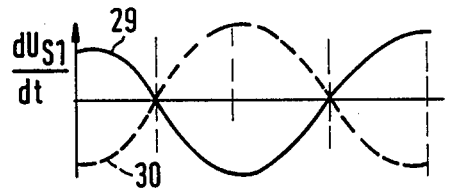
Figure 4C:
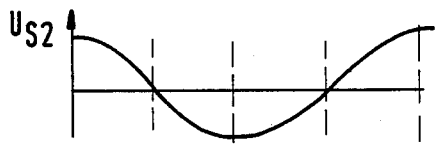
Figure 4D:
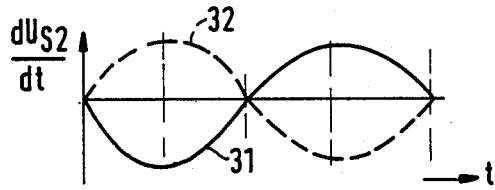

The sign of the angular velocity can be determined from the derivatives of the path transmitter signals and from the path transmitter signals themselves. For constant angular velocity, the variation with time of the output voltage $V_{S1}$ of the output 3 is shown in FIG. 4a and the variation with time of the output voltage $V_{S2}$ of the output 4 in FIG. 4c. FIG. 4b shows, for two angular velocities $\omega>0$ and $\omega<0$, the two signals 29 for $\omega>0$ and 30 for $\omega<0$ which are formed from $V_{S1}$ by differentiation. From FIG. 4d there can be noted for two angular velocities $\omega>0$ and $\omega<0$ two signals 31 and 32 formed by differentiation of $V_{S2}$. The sign of the angular velocity $\omega$ is dependent as follows on $V_{S1}$, $V_{S2}$ as well as

| $\frac{dV_{s1}}{dt}$ and $\frac{dV_{s2}}{dt}$ | |
|---|---|
| $\omega > 0$ if | $\omega < 0$ if |
| $V_{s1} > 0$ and $\frac{dV_{s2}}{dt} < 0$ | $V_{s1} > 0$ and $\frac{dV_{s2}}{dt} > 0$ |
| or $V_{s1} < 0$ and $\frac{dV_{s2}}{dt} > 0$ | $V_{s1} < 0$ and $\frac{dV_{s2}}{dt} < 0$ |
| or $V_{s2} > 0$ and $\frac{dV_{s1}}{dt} > 0$ | $V_{s2} > 0$ and $\frac{dV_{s1}}{dt} < 0$ |
| or $V_{s2} < 0$ and $\frac{dV_{s1}}{dt} < 0$ | $V_{s2} < 0$ and $\frac{dV_{s1}}{dt} > 0$ |

Figure 5:
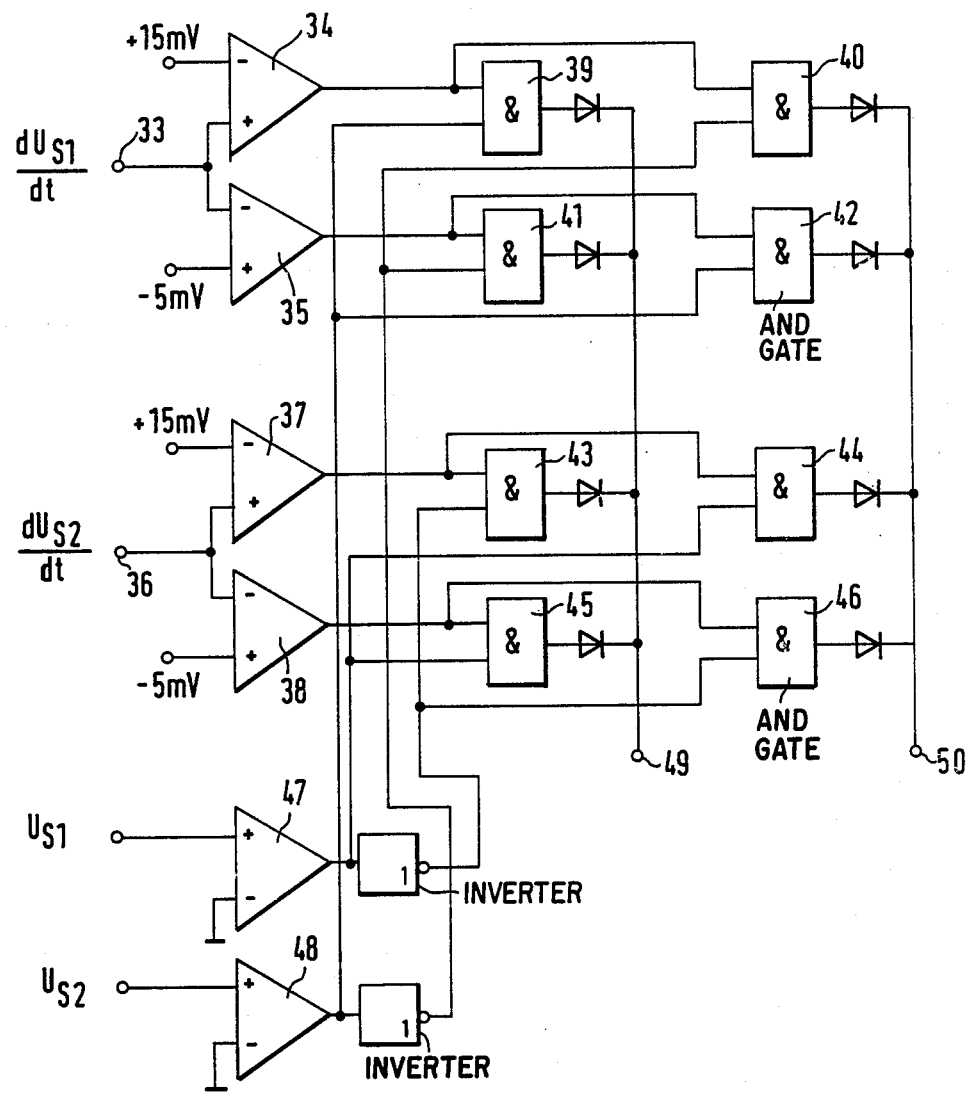
FIG. 5 is a circuit diagram of a first arrangement for determining the sign of the angular velocity from two signals produced by an angle transmitter.

An arrangement suitable for determining the sign of the angular velocity $\omega$ is shown in FIG. 5. The differentiating member 12a feeds an input 33 to which the non-inverting input of a first comparator 34 and the inverting input of a second comparator 35 are connected. The comparator 34 is acted upon at its inverting input by a slight positive potential, i.e. it changes its output signal upon negative input levels. The comparator 35 is acted upon at its non-inverting input by a slight negative potential, i.e. it changes its output signal upon positive input levels. A second input 36 of the arrangement shown in FIG. 5 is connected to the output of the differentiating member 12b. Two comparators 37, 38 are arranged behind the input 36 in the same manner as behind the input 33.

Two AND members 39, 40; 41, 42; 43, 44; and 45, 46 are connected respectively behind the comparators 34, 35, 37, 38. The outputs 3 and 4 of the preparation electronics feed, via two comparators 47, 48, the AND members 44 and 45 as well as the AND members 39 and 42 respectively. The output signal of the amplifier 47 is applied, after inversion, to the AND members 43 and 46. The output signal of the amplifier 48 is applied, after inversion, to the AND members 40 and 41. Diodes, not described in detail, are arranged as OR operation behind the AND members 39, 41, 43 and 45, the cathodes of said diodes being connected to each other and forming an output 49 of the circuit. Diodes, also not shown in detail, are connected as OR operation also behind the AND members 40, 42, 44 and 46, the cathodes of said diodes forming an output 50 of the circuit. The corresponding combination of the levels at the outputs 49, 50 has the sign of the angular velocity $\omega$. The levels of the binary circuits can be H (high) or L (low). In the following table the combinations of levels at the outputs 49, 50 are shown for the three conditions of $\omega$, namely zero, greater than zero and less than zero.

| $\omega$ | 49 | 50 |
|---|---|---|
| 0 | L | L |
| >0 | L | H |
| <0 | H | L |

If, for instance, $dV_{S1}/dt$ is positive, then the comparator 34 gives off a high level. If $V_{S2}$ is at the same time positive, then the AND member 39 at the output shows a high level so that a high level is produced at the common output 49 of the AND members 39, 41, 43, 45 connected to each other by an OR operation, while a low level is present at the output 50. On the other hand, if $V_{S1}$ and $dV_{S2}/dt$ are positive then the AND member 44 shows a high level at the output, as a result of which there is a high level at the output 50 while the output 49 has a low level. The association with the corresponding sign of the angular velocity can be noted from the above table.

Figure 6:
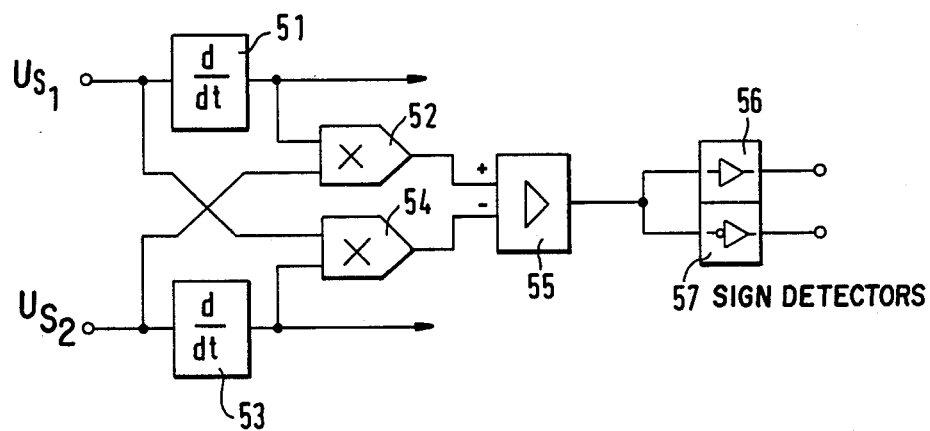
FIG. 6 is a circuit diagram of a second arrangement for determining the sign of the angular velocity from two signals produced by an angle transmitter.

FIG. 6 shows another arrangement for the determination of the sign of the angular velocity. The signals $V_{S1}$ and $V_{S2}$ as well as their derivatives with respect to time are required. The signal $V_{S1}$ is applied via a differentiating member 51 to a multiplier 52 whose second input is acted on directly by the signal $V_{S2}$. The signal $V_{S2}$ is fed via a differentiating member 53 to a multiplier 54 whose second input is acted on directly by the signal $V_{S1}$. The multipliers 52, 54 feed respective inputs of a difference amplifier 55 behind which two comparators 56, 57 are connected, one of which 56 determines a passage through zero in positive direction and the other 57 a passage through zero in negative direction.

The analog multiplier 52 forms the product $V_{S2}\cdot dV_{S1}/dt$ which can be positive or negative depending on the polarity of the two input variables. In the same way the analog multiplier 54 forms the product $$V_{S1} \cdot \frac{dV_{S2}}{dt},$$

which is positive or negative as a function of the polarity of the input variables. Between the polarity of the product $V_{S2}\cdot dV_{S1}/dt$ obtained with an analog multiplier and the angular velocity $\omega$ there is the relationship indicated in the following table. The relationship between the polarity of the product $V_{S2}\cdot dV_{S1}/dt$ obtained with an analog multiplier and the angular velocity is also indicated in the table. From this the values indicated in the table can be obtained for the difference

| Function | $V_2 \cdot \frac{dV_{s1}}{dt} - V_1 \frac{dV_{s2}}{dt}$ | | |
|---|---|---|---|
| | $\omega > 0$ | $\omega = \sigma$ | $\omega < 0$ |
| $V_1 \cdot \frac{dV_{s2}}{dt}$ | $<0$ | $0$ | $>0$ |
| $V_2 \cdot \frac{dV_{s1}}{dt}$ | $>0$ | $0$ | $<0$ |
| $V_2 \cdot \frac{dV_{s1}}{dt} - V_1 \cdot \frac{dV_{s2}}{dt}$ | $>0$ | $0$ | $<0$ |

The comparators 56 and 57 therefore give off at their outputs the three possible states of $\omega$, levels shown in the following table:

| $\omega$ | 56 | 57 |
|---|---|---|
| 0 | L | L |
| >0 | L | H |
| <0 | H | L |

The above-described circuits for the determination of the value and sign of the angular velocity operate in analog fashion. Therefore, long computing times are not required for the calculation. Dead times are therefore dispensed with. One essential advantage of analog circuits lies in the extremely high signal speed, together with an infinitely high resolution.

With the arrangements, true-time velocity determinations, particularly even in the case of slow movements, can be carried out, linear movements being converted into rotations for the velocity measurement. The values for the angular velocity are available even with fractions of complete revolutions. Residual ripple and dead time are avoided.

Legends of FIGS. 1 and 2:
2. Transmitter- Preparation
7. Differentiating Member
9. inverting Member V=−1
11. Zero-voltage Comparator
12a. Differentiating Member
12b. Differentiating Member

I claim:

1. A method for determining the amount and sign of angular velocity from two voltage signals produced by an angle transmitter, which signals have a sinusoidal course with respect to an angle of rotation of a rotatable body and are shifted 90 degrees in phase with respect to each other, comprising
   obtaining derivatives, with respect to time, of said first and said second voltage signals said derivatives being obtained by applying said signals to differentiating means connecting dividing means to the differentiating means and, by said dividing means;
   dividing the derivative with respect to time of the first voltage signal by the second voltage signal when said second voltage signal is above zero; and
   within a signal region in which the second voltage signal passes below zero, dividing the derivative with respect to time of the second voltage signal by the first voltage signal by said dividing means; and employing an inverter for inverting the resulting dividend.

2. A system for determining the amount and sign of angular velocity from two voltage signals produced by an angle transmitter, which signals have a sinusoidal course with respect to an angle of rotation of a rotatable body and are shifted 90 degrees in phase with respect to each other, comprising
   differentiator means;
   divider means having a dividend input connected to an output of said differentiator means;
   jointly actuatable switches coupled to an input terminal of said differentiator means and to a divisor input terminal of said divider means;
   an inverter connected to an output quotient terminal of said divider means; zero voltage comparator for controlling said jointly actuable switches and a further switch; wherein
   said switches are operable to conduct the first voltage signal, in the region of passages above zero of the second voltage signal, to said differentiator means, and to conduct the second voltage signal to the divider input of said divider means; and
   in the region of the passages below zero of the second voltage signal, said switches are operable to interchange the applications of the first and second voltage signals to said differentiator and said divider means, said further switch being operable with said inverter to provide a phase correction during said signal interchange.

3. A system according to claim 2, wherein said differentator means, said divider means, said jointly actuatable switches and said further switches comprise circuits of analog operation for a high signal processing speed.

* * * * *